US012617247B2

(12) United States Patent
Watson et al.

(10) Patent No.: US 12,617,247 B2
(45) Date of Patent: May 5, 2026

(54) TOW HOOK ASSEMBLIES AND VEHICLES INCLUDING SAME

(71) Applicant: Toyota Motor Engineering & Manufacturing North America, Inc., Plano, TX (US)

(72) Inventors: Skylar Watson, Williamston, MI (US); Jeremiah Hammer, Ann Arbor, MI (US); George DeWitt, Ypsilanti, MI (US); William Castleman, Canton, MI (US); Todd Muck, Fowlerville, MI (US); Richard T. Starks, Ypsilanti, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 619 days.

(21) Appl. No.: 18/173,315

(22) Filed: Feb. 23, 2023

(65) Prior Publication Data
US 2024/0286446 A1    Aug. 29, 2024

(51) Int. Cl.
*B60D 1/52* (2006.01)
*B60D 1/04* (2006.01)
*B60D 1/48* (2006.01)

(52) U.S. Cl.
CPC ................. *B60D 1/52* (2013.01); *B60D 1/04* (2013.01); *B60D 1/488* (2013.01)

(58) Field of Classification Search
CPC . B60D 1/52; B60D 1/04; B60D 1/488; B60D 1/565
USPC .......................................................... 280/501
See application file for complete search history.

(56)                References Cited

U.S. PATENT DOCUMENTS

| | | | |
|---|---|---|---|
| 6,896,281 B2 | 5/2005 | Lenzen, et al. | |
| 7,775,546 B2 | 8/2010 | Asjad | |
| 2004/0090041 A1* | 5/2004 | Lenzen, Jr. .............. | B60D 1/52 |
| | | | 280/495 |

(Continued)

FOREIGN PATENT DOCUMENTS

| | | |
|---|---|---|
| CN | 106945726 B | 7/2020 |
| CN | 113415112 A | 9/2021 |

(Continued)

OTHER PUBLICATIONS

Merged original document with English translation (KR 20020047931). (Year: 2025).*

*Primary Examiner* — Valentin Neacsu
*Assistant Examiner* — Nathaniel William Watkins
(74) *Attorney, Agent, or Firm* — Dinsmore & Shohl LLP

(57)                ABSTRACT

A tow hook assembly includes a tow hook body, a support bracket, and a disengagement bracket. The tow hook body includes a leading end, an opposite rear end, and an angled portion sloping downwardly in a direction opposite the leading end. A rear open-ended hole is formed in the rear end. A front open-ended hole is formed in the support bracket. A front fastener extends through the front open-ended hole formed in the support bracket to removably couple the tow hook body to the support bracket, and engagement member received within the rear open-ended hole formed in the tow hook body to removably couple the disengagement bracket to the tow hook body.

17 Claims, 9 Drawing Sheets

(56)                          References Cited

U.S. PATENT DOCUMENTS

| | | | | |
|---|---|---|---|---|
| 2005/0051994 A1* | 3/2005 | Rodgers | .................. | B60D 1/00 |
| | | | | 280/416.1 |
| 2020/0070602 A1* | 3/2020 | Greggs | ................. | B60D 1/143 |
| 2024/0140160 A1* | 5/2024 | Provencher | ............. | B60D 1/48 |

FOREIGN PATENT DOCUMENTS

| | | | | | |
|---|---|---|---|---|---|
| CN | 114211918 | A | | 3/2022 | |
| CN | 216580007 | U | | 5/2022 | |
| EP | 2623345 | B1 | | 4/2018 | |
| JP | 2007237867 | A | | 9/2007 | |
| KR | 20020047931 | A | * | 6/2002 | .............. B60D 1/02 |

* cited by examiner

TOW HOOK ASSEMBLIES AND VEHICLES INCLUDING SAME

TECHNICAL FIELD

The present specification generally relates to tow hooks for vehicles and, more specifically, a detachable tow hook that reduces impact with an object or person during a vehicle front end collision.

BACKGROUND

To tow a vehicle in the event of an accident, malfunction, loss of gas, or being stuck in mud or snow, tow hooks are provided at specific locations of a frame of the vehicle to tow the vehicle without damage. Tow hooks are typically mounted on a front rail of the vehicle and may extend through apertures formed in a front bumper of the vehicle to project outwardly therefrom. Alternatively, tow hooks may project from beneath the front bumper. The tow hooks may be positioned and painted to maintain an aesthetically pleasing appearance of the vehicle.

Tow hooks are typically formed from a rigid material to withstand large forces when being towed and to remain secured to the vehicle itself. As such, the tow hooks may result in an impact with a barrier during a front end collision.

Accordingly, a need exists for an improved vehicle with a tow hook assembly that reduces impact with a barrier during a front end collision by bending, moving, or entirely detaching from the vehicle.

SUMMARY

In one embodiment, a tow hook assembly includes: a tow hook body including a leading end, an opposite rear end, and an angled portion sloping downwardly in a direction opposite the leading end, a rear open-ended hole formed in the rear end; a support bracket, a front open-ended hole formed in the support bracket; a disengagement bracket; a front fastener extending through the front open-ended hole formed in the support bracket to removably couple the tow hook body to the support bracket; and an engagement member received within the rear open-ended hole formed in the tow hook body to removably couple the disengagement bracket to the tow hook body.

In another embodiment, a tow hook assembly includes: a tow hook body including a front fastener, a rear open-ended hole formed proximate an opposite rear end of the tow hook body, a front angled portion formed between the front fastener and a leading end of the tow hook body, and a rear angled portion formed between the front fastener and the rear open-ended hole; a support bracket having a front open-ended hole for removably receiving the front fastener of the tow hook body; and a disengagement bracket having an engagement member removably received within the rear open-ended hole formed in the tow hook body.

In yet another embodiment, a vehicle includes: a vehicle frame including: a front bumper beam; a first side rail extending from the front bumper beam; and a crossmember extending in a vehicle lateral direction between the front bumper beam rearward of the front bumper beam; and a first tow hook assembly including: a tow hook body including a leading end, an opposite rear end, and an angled portion sloping downwardly in a direction opposite the leading end, a rear open-ended hole formed in the rear end; a support bracket mounted to the front bumper beam, a front open-ended hole formed in the support bracket, the tow hook body removably coupled to the support bracket at the front open-ended hole; and a disengagement bracket mounted to the first side rail, the tow hook body removably coupled to the disengagement bracket at the rear open-ended hole.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
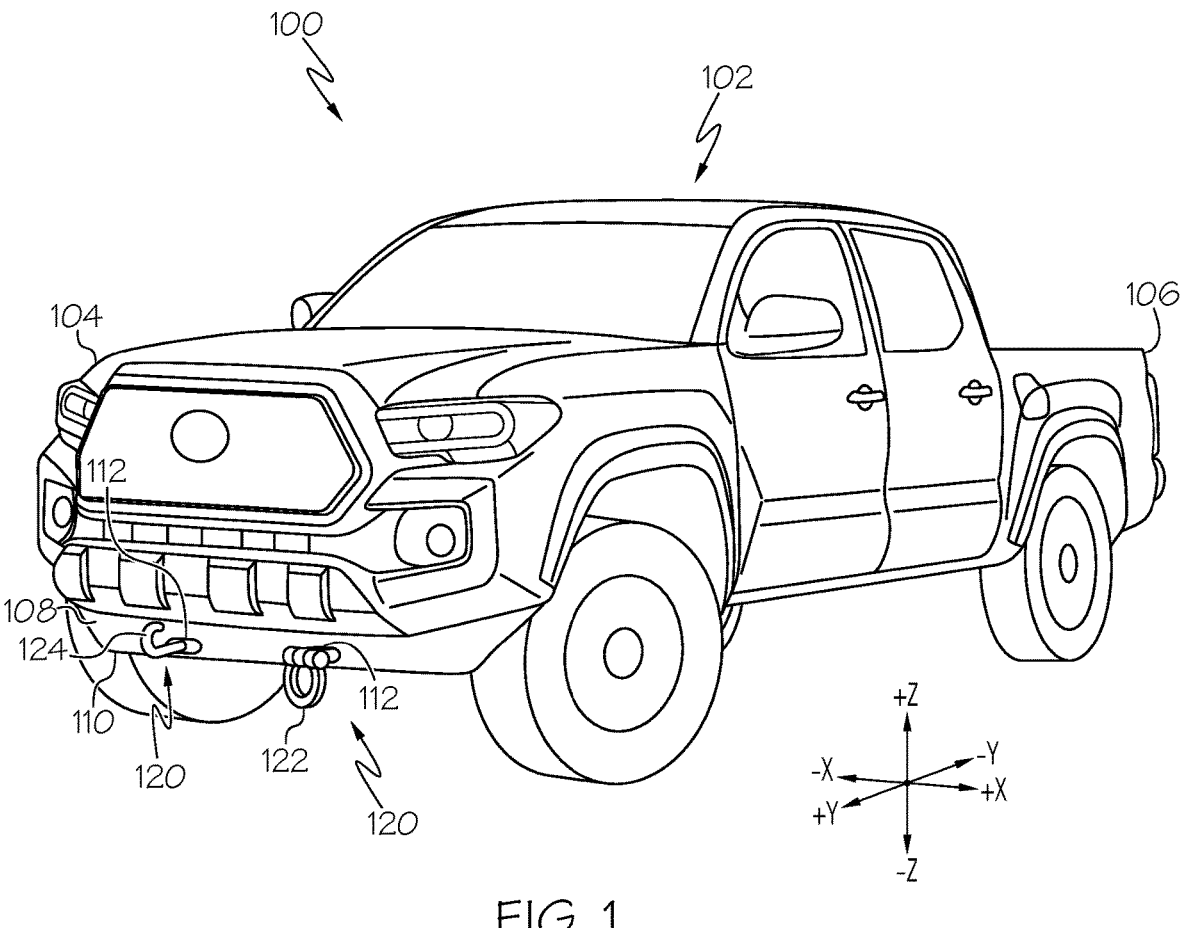
FIG. 1 schematically depicts a perspective view of a vehicle including a pair of tow hook assemblies, according to one or more embodiments shown and described herein.

Embodiments described herein are directed to tow hook assemblies for vehicles that include a tow hook body that moves relative to a vehicle frame of the vehicle upon contact with a barrier during a front end collision and subsequently detaches from the vehicle frame upon a force exceeding a predetermined threshold. However, the tow hook body remains attached to the vehicle frame as the tow hook body is towed in an opposite towing direction.

The tow hook assembly generally includes a tow hook body, a support bracket, and a disengagement bracket. The tow hook body includes a leading end, an opposite rear end, and an angled portion sloping downwardly in a direction opposite the leading end. A rear open-ended hole formed in the rear end. The support bracket has a front open-ended hole formed therein. A front fastener extends through the front open-ended hole formed in the support bracket to removably couple the tow hook body to the support bracket, and a rear fastener extends through the rear open-ended hole formed in the tow hook body to removably couple the disengagement bracket to the tow hook body. Upon a force being applied against the leading end of the tow hook body, the front fastener disengages the front open-ended hole formed in the support bracket and the rear fastener disengages the rear open-ended hole formed in the tow hook body. Various embodiments of the tow hook assemblies and the operation of the tow hook assemblies are described in more detail herein. Whenever possible, the same reference numerals will be used throughout the drawings to refer to the same or like parts.

As used herein, the term "vehicle longitudinal direction" refers to the forward-rearward direction of the vehicle (i.e., in the +/−Y direction of the coordinate axes depicted in FIG. 1). The term "vehicle lateral direction" refers to the cross-vehicle direction (i.e., in the +/−X direction of the coordinate axes depicted in FIG. 1), and is transverse to the vehicle longitudinal direction. The term "vehicle vertical direction" refers to the upward-downward direction of the vehicle (i.e., in the +/−Z direction of the coordinate axes depicted in FIG. 1). As used herein, "upper" and "above" are defined as the positive Z direction of the coordinate axes shown in the drawings. "Lower" and "below" are defined as the negative Z direction of the coordinate axes shown in the drawings.

Referring now to FIG. 1, a vehicle 100 is generally illustrated according to one or more embodiments described herein. As shown, the vehicle 100 is illustrated as a pickup truck. However, the vehicle 100 may be any suitable automobile including coupes, sedans, minivans, crossovers, hybrids, sports utility vehicles, or the like, in addition to other vehicles such as a bus, boat, or the like, without limiting the scope of the present disclosure. The vehicle 100 includes a body 102 having a front end 104, a rear end 106 opposite the front end 104, and a front bumper 108 having a bottom surface 110 provided at the front end 104 of the body 102 of the vehicle 100.

The vehicle 100 includes one or more tow hook assemblies 120 located at the front end 104 of the body 102 of the vehicle 100. For example, as depicted herein, the vehicle 100 includes a pair of tow hook assemblies 120 that extend through respective channels 112 formed in the front bumper 108. It should be appreciated that the tow hook assemblies 120 may include any suitable hook attachment provided at a leading end thereof for attaching the tow hook assembly 120 to a hook, such as a hook extending from an object being towed or towing the vehicle 100. As a non-limiting example of a suitable hook attachment, as shown in FIG. 1, one of the tow hook assemblies 120 includes a one-piece hook attachment 124 integrally formed as a monolithic structure with the respective tow hook assembly 120. As another non-limiting example of a suitable hook attachment, as shown in FIG. 1, the other of the tow hook assemblies 120 includes a shackle 122 rotatably or pivotably coupled to the respective tow hook assembly 120. However, it should be appreciated that the tow hook assembly 120 may be utilized with any suitable hook attachment other than those described herein. Additionally, it should be appreciated that the vehicle 100 may include any number of tow hook assemblies 120, such as one tow hook assembly 120 or more than two tow hook assemblies 120. Moreover, the tow hook assembly 120 may be mounted at any suitable location of the vehicle 100 such as, for example, at the bottom surface 110 of the front bumper 108, at the front end 104 of the vehicle 100, or to a cross member of the vehicle 100 located in a rearward vehicle longitudinal direction of the front bumper 108 (in the −Y direction of the coordinate axes depicted in FIG. 1).

Figure 2:
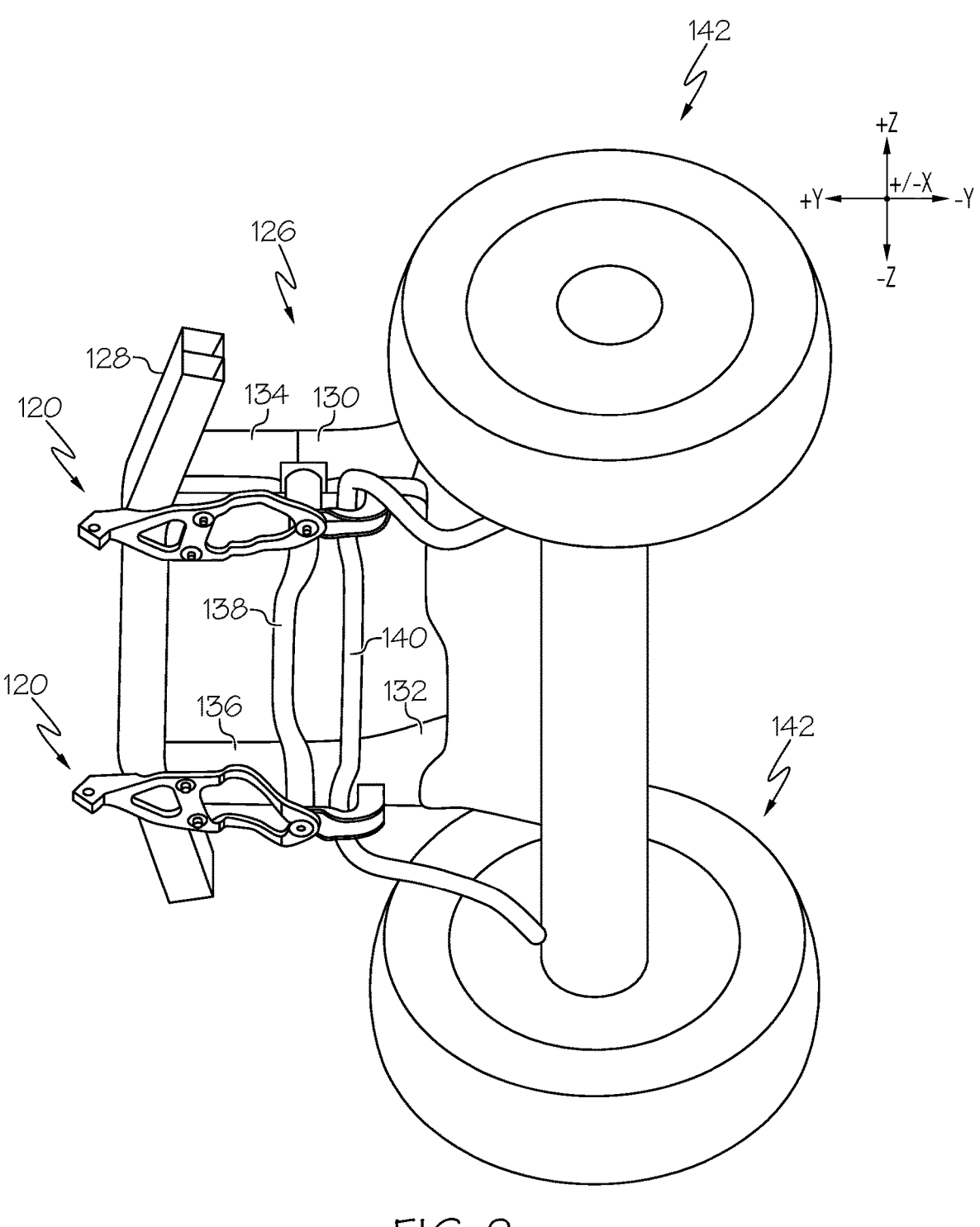
FIG. 2 schematically depicts a partial bottom perspective view of a vehicle frame of the vehicle including the pair of tow hook assemblies, according to one or more embodiments shown and described herein.

Referring now to FIG. 2, a bottom perspective view of a vehicle frame 126 of the vehicle 100 is illustrated including a pair of tow hook assemblies 120 mounted thereto without a respective hook attachment. As shown in FIG. 2, the vehicle 100 further includes front bumper reinforcement beam 128 extending in the vehicle lateral direction, a first side rail 130 and an opposite second side rail 132 each extending in the vehicle longitudinal direction, a first crush box 134 extending between the first side rail 130 and the front bumper reinforcement beam 128, and a second crush box 136 extending between the second side rail 132 and the front bumper reinforcement beam 128. In embodiments, the front bumper reinforcement beam 128 is provided rearward of the front bumper 108 (FIG. 1). However, in embodiments, the front bumper reinforcement beam 128 may be integrally formed with the front bumper 108 such that the tow hook assembly 120 is mounted directly to the front bumper 108.

The term "crush box" may refer to an energy absorbing device installed between the side rails 130, 132 and the front bumper reinforcement beam 128 to reduce an impact force exhibited during vehicle collisions. In embodiments, it should be appreciated that the first crush box 134 may be integrated into the first side rail 130, and the second crush box 136 may be integrated into the second side rail 132, or omitted entirely. Accordingly, reference may be made to the first side rail 130 and the second side rail 132 themselves extending from the front bumper reinforcement beam 128. The vehicle frame 126 further includes a crossmember 138 extending between the first side rail 130 and the second side rail 132 in the vehicle lateral direction. As shown in FIG. 2, one of the tow hook assemblies 120 may be mounted to a first end of the crossmember 138 and the other tow hook assembly 120 may be mounted to an opposite second end of the crossmember 138. In embodiments, the vehicle frame 126 further includes a stabilizer bar 140 extending between wheel assemblies 142 of the vehicle 100.

Figure 3:
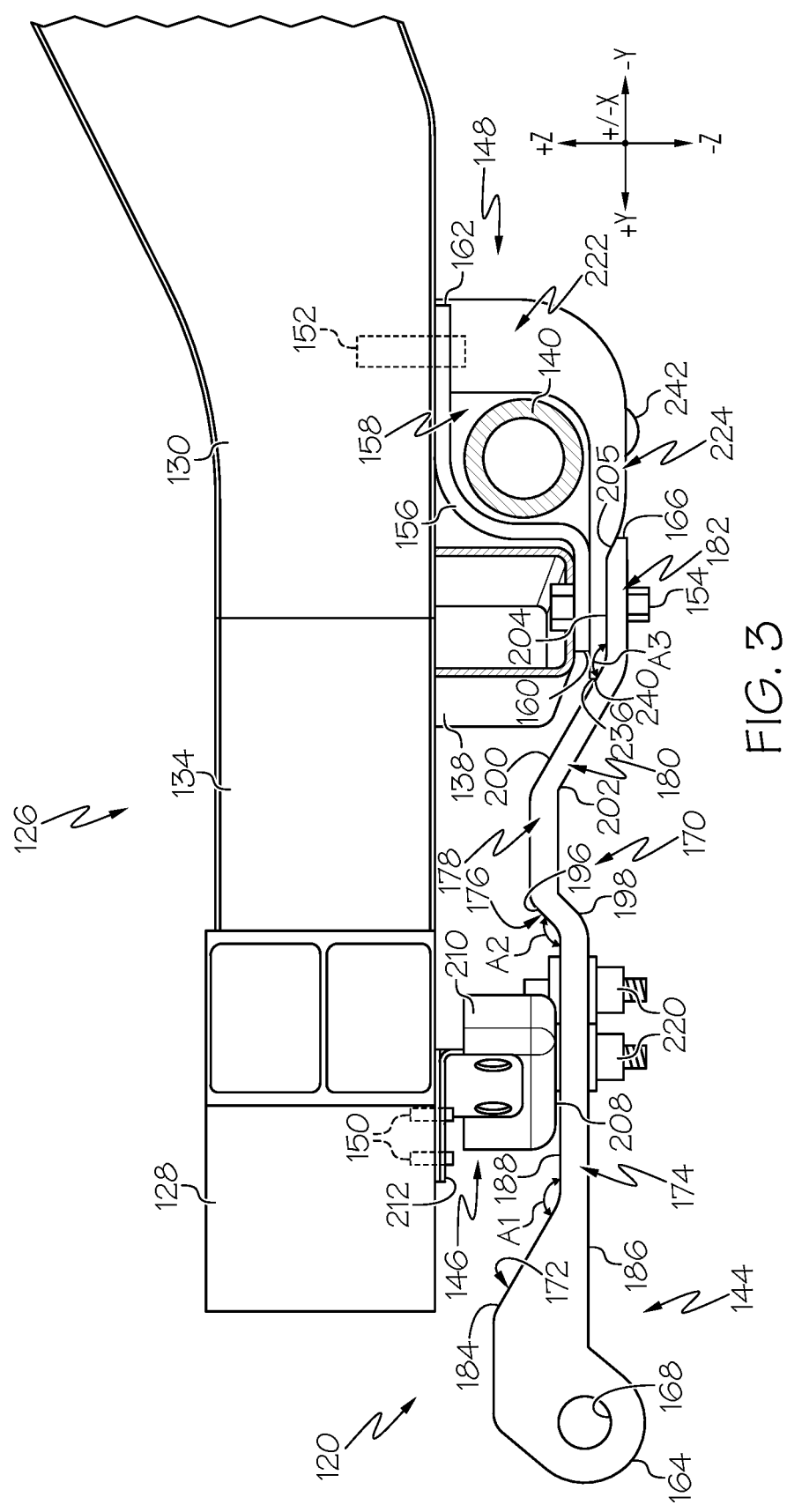
FIG. 3 schematically depicts a side view of one of the tow hook assemblies in an assembled state mounted to the vehicle frame, according to one or more embodiments shown and described herein.

Referring now to FIG. 3, a side view of one of the tow hook assemblies 120 is illustrated mounted to the vehicle frame 126 and, particularly, the tow hook assembly 120 mounted to the first side rail 130. It should be appreciated that the other tow hook assembly 120 mounted to the second side rail 132 includes similar structure and operates in a similar manner as that discussed herein.

The tow hook assembly 120 includes a tow hook body 144, a support bracket 146, and a disengagement bracket 148. As described in more detail herein, the tow hook body 144 is coupled to the front bumper beam 128 by the support bracket 146 and to the first side rail 130 by the disengagement bracket 148. The support bracket 146 may be fixed to the front bumper beam 128 in any suitable manner such as, for example, welding, fastening, or the like. As shown in FIG. 3, a pair of fasteners 150 extend through the support bracket 146 and into a bottom surface of the front bumper beam 128 to fix the support bracket 146 to the front bumper beam 128. However, it should be appreciated that only a single fastener 150 may be utilized to fix the support bracket 146 to the front bumper beam 128.

In embodiments, the disengagement bracket 148 may be fixed to the first side rail 130 in any suitable manner such as, for example, welding, fastening, or the like. As shown in FIG. 3, a fastener 152 extends through the disengagement bracket 148 and into a bottom surface of the first side rail 130 to fix the disengagement bracket 148 to the first side rail 130. In embodiments, the disengagement bracket 148 may additionally or alternatively be fixed to the crossmember 138 in any suitable manner such as, for example, welding, fastening, or the like.

As shown in FIG. 3, a rear fastener 154 extends through the disengagement bracket 148 and into a bottom surface of the crossmember 138 to fix the disengagement bracket 148 to the crossmember 138. Although the disengagement bracket 148 is depicted herein as being fixed to both the first side rail 130 and the crossmember 138, it should be appreciated that, in embodiments, the disengagement bracket 148 may be fixed to only one of the first side rail 130 and the crossmember 138. For example, the disengagement bracket 148 may be fixed to the crossmember 138, but not the first side rail 130. However, fixing the disengagement bracket 148 to both the first side rail 130 and the crossmember 138 increases the strength of which the disengagement bracket 148 is secured to the vehicle frame 126 during a front end collision and improves disengagement of the tow hook body 144 with the disengagement bracket 148, as described in more detail herein.

In embodiments, the tow hook assembly 120 further includes a stabilizer bar shield 156 cooperating with the disengagement bracket 148 to define a cavity 158 through which the stabilizer bar 140 extends. As shown in FIG. 3, a first end 160 of the stabilizer bar shield 156 is sandwiched between the crossmember 138 and the disengagement bracket 148, and an opposite second end 162 of the stabilizer bar shield 156 is sandwiched between the first side rail 130 and the disengagement bracket 148. As shown, the fastener 152 extending through the disengagement bracket 148 and the first side rail 130 may also extend through the second end 162 of the stabilizer bar shield 156.

Figure 4:
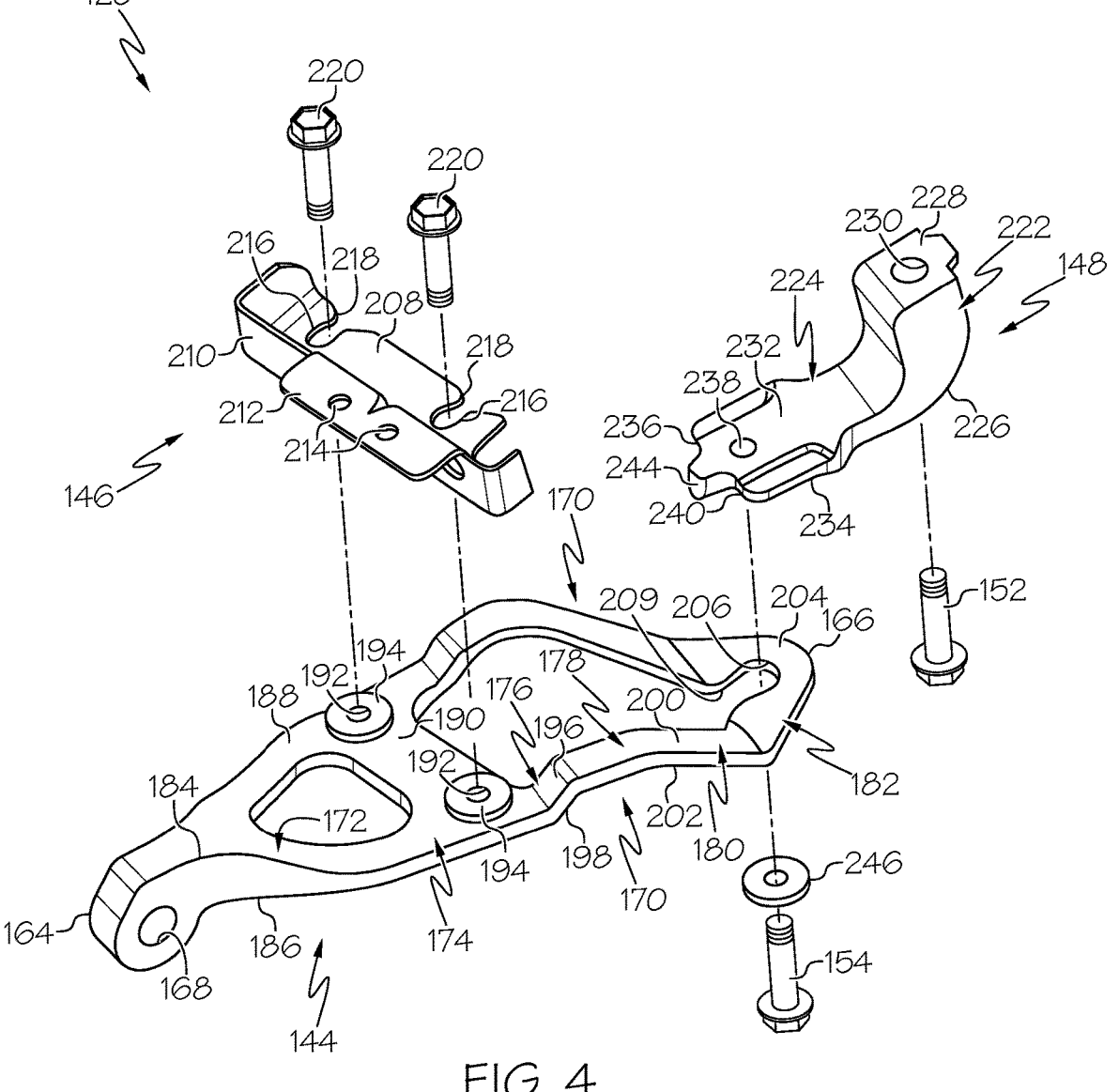
FIG. 4 schematically depicts an exploded perspective view of the tow hook assembly, according to one or more embodiments shown and described herein.

Referring now to FIG. 4, an exploded view of the tow hook assembly 120 is illustrated including the tow hook body 144, the support bracket 146, and the disengagement bracket 148. With more particularly, the tow hook body 144 includes a leading end 164 and an opposite rear end 166. A bore 168 is formed in the leading end 164 of the tow hook body 144 through which a hook attachment, such as the shackle 122 shown in FIG. 1, may be rotatably or pivotably coupled.

The tow hook body 144 includes a pair of side arms 170 extending between the leading end 164 and the rear end 166. In embodiments, the side arms 170 define a front angled portion 172 sloping downwardly from the leading end 164 in a rearward vehicle longitudinal direction, a first horizontal portion 174 extending from the front angled portion 172, a transition portion 176 extending from the first horizontal portion 174 and sloping upwardly in the rearward vehicle longitudinal direction, a second horizontal portion 178 extending from the transition portion 176, a rear angled portion 180 sloping downwardly from the second horizontal portion 178 in the rearward vehicle longitudinal direction, and a third horizontal portion 182 extending from the rear angled portion 180.

As shown in FIGS. 3 and 4, the front angled portion 172 is formed in the tow hook body 144 at a side of the support bracket 146 opposite the disengagement bracket 148. The front angled portion 172 has an upper surface 184 and an opposite lower surface 186. In embodiments, the upper surface 184 slopes downwardly in a direction opposite the leading end 164 while the lower surface 186 of the front angled portion 172 remains horizontal. However, it should be appreciated that, in embodiments, both the upper surface 184 and the lower surface 186 of the front angled portion 172 slope downwardly. A first angle A1 is an obtuse angle defined between the upper surface 184 of the front angled portion 172 and an upper surface 188 of the first horizontal portion 174 is greater than 90 degrees and less than 180 degrees. In embodiments, the first angle A1 is equal to or greater than 110 degrees and less than or equal to 170 degrees. In embodiments, the first angle A1 is equal to or greater than 120 degrees and less than or equal to 160 degrees. In embodiments, the first angle A1 is equal to or greater than 130 degrees and less than or equal to 150 degrees.

In embodiments, the tow hook body 144 includes a bridge 190 extending between the pair of side arms 170 at the first horizontal portion 174. In addition, in embodiments, one or more front fastener holes 192 are formed in the first horizontal portion 174 proximate a location at which the bridge 190 extends between the side arms 170. As shown, a front fastener hole 192 is formed in each side arm 170 at opposite intersection locations of the bridge 190 and the side arms 170. Accordingly, the bridge 190 provides additional surface area in which the front fastener holes 192 may be formed to improve structural integrity and reduce the likelihood of fracturing. In embodiments, a front raised surface 194 is formed as a one-piece, monolithic structure on each side arm 170 of the tow hook body 144 proximate the bridge 190 and circumscribes each front fastener hole 192. Although a pair of front fastener holes 192 and a front raised surface 194 circumscribing each front fastener hole 192 are illustrated in FIG. 4, it should be appreciated that, in embodiments, the tow hook body 144 may include only a single front fastener hole 192 and a single front raised surface 194. For example, the front fastener hole 192 and the front raised surface 194 may be provided on only one of the side arms 170 or, alternatively, provided at a central location of the bridge 190 between the side arms 170.

The transition portion 176 has an upper surface 196 and an opposite lower surface 198. In embodiments, the upper surface 196 and the lower surface 198 slope upwardly in a direction opposite the leading end 164. However, it should be appreciated that, in embodiments, the lower surface 198 of the transition portion 176 remains horizontal and only the upper surface 196 slopes upwardly. A second angle A2 is an obtuse angle defined between the upper surface 188 of the first horizontal portion 174 and the upper surface 196 of the transition portion 176 is greater than 90 degrees and less than 180 degrees. In embodiments, the second angle A2 is equal to or greater than 110 degrees and less than or equal to 170 degrees. In embodiments, the second angle A2 is equal to or greater than 120 degrees and less than or equal to 160 degrees. In embodiments, the second angle A2 is equal to or greater than 130 degrees and less than or equal to 150 degrees.

The rear angled portion 180 is formed in the tow hook body 144 between the support bracket 146 and the disengagement bracket 148. The rear angled portion 180 has an upper surface 200 and an opposite lower surface 202. In embodiments, the upper surface 200 and the lower surface 202 slope downwardly in a direction opposite the leading end 164. However, it should be appreciated that, in embodiments, the lower surface 202 of the rear angled portion 180 remains horizontal and only the upper surface 200 slopes downwardly. A third angle A3 is an obtuse angle defined between the upper surface 200 of the rear angled portion 180 and an upper surface 204 of the third horizontal portion 182 is greater than 90 degrees and less than 180 degrees. In embodiments, the third angle A3 is equal to or greater than 110 degrees and less than or equal to 170 degrees. In embodiments, the third angle A3 is equal to or greater than 120 degrees and less than or equal to 160 degrees. In embodiments, the third angle A3 is equal to or greater than 130 degrees and less than or equal to 150 degrees.

A rear open-ended hole 206 is formed at the rear end 166 of the tow hook body 144 and, particularly, within the third horizontal portion 182. The rear open-ended hole 206 has an open end 209 facing the leading end 164 of the tow hook body 144. In embodiments, the material forming the tow hook body 144 or at least the material defining the rear open-ended hole 206 is deformable upon a force exceeding a predetermined threshold being applied such that the rear fastener 154 and, in embodiments, an insert portion 247, may disengage the rear open-ended hole 206, as described in more detail herein. Accordingly, reference may be made herein to an engagement member, which may include either one or both of the insert portion 247 and/or the rear fastener 154 as being received within the rear open-ended hole 206 formed in the tow hook body 144 to facilitate disengagement of the tow hook body 144 with the disengagement bracket 148. In embodiments, an end 205 (FIG. 3) of the upper surface 204 of the third horizontal portion 182 opposite the rear angled portion 180 is tapered.

Referring still to FIGS. 3 and 4, in embodiments, the support bracket 146 includes a bottom wall 208, a side wall 210 extending upwardly from the bottom wall 208, and an upper wall 212 extending from an upper end of the side wall 210 opposite the bottom wall 208. In embodiments, the upper wall 212 extends parallel to the bottom wall 208. As described herein, the support bracket 146 may be fixed to the front bumper beam 128 in any suitable manner such as by welding, fastening, or the like. As shown in FIG. 4, one or more apertures 214 may be formed in the upper wall 212 and/or the side wall 210 through which the fasteners 150 illustrated in FIG. 3 may extend. The support bracket 146 also includes one or more front open-ended holes 216 formed in the bottom wall 208 of the support bracket 146 and coaxial with the front fastener holes 192 formed in the tow hook body 144. As shown in FIG. 4, the support bracket 146 includes a pair of front open-ended holes 216 spaced apart from one another such that each front open-ended hole 216 is coaxial with a respective front fastener hole 192 formed in the tow hook body 144. However, it should be appreciated that in embodiments in which only one front fastener hole 192 is formed in the tow hook body 144, the support bracket 146 includes only one front open-ended hole 216 formed therein and coaxial with the front fastener hole 192.

The front open-ended holes 216 have an open end 218 facing a direction opposite the side wall 210 of the support bracket 146. In embodiments, the material forming the support bracket 146 or at least the material defining the front open-ended hole 216 is deformable upon a force exceeding a predetermined threshold being applied such that a front fastener 220 may disengage the front open-ended hole 216, as described in more detail herein. A width W2 of the open end 218 is less than a diameter D2 of the front open-ended hole 216. It should be appreciated that the smaller the width W2 of the open end 218 is relative to the diameter D2 of the front open-ended hole 216, the greater the amount of force is required to disengage the rear fasteners 220 from the front open-ended holes 216, as described herein.

As shown in FIG. 4, the front fastener 220 extends through each front open-ended hole 216 formed in the support bracket 146 and through a respective front fastener hole 192 formed in the tow hook body 144. Although a pair of front fasteners 220 are depicted, it should be appreciated that only a single front fastener 220 may be utilized in embodiments in which the support bracket 146 includes only a single front open-ended hole 216 and the tow hook body 144 includes only a single front fastener hole 192. In embodiments, the front raised surfaces 194 are compressed between the tow hook body 144 and the bottom wall 208 of the support bracket 146 when the tow hook body 144 and the support bracket 146 are secured to one another by respective front fasteners 220. As described in detail herein, the front fasteners 220 disengage from respective front open-ended holes 216 upon a force exceeding a predetermined threshold being applied against the leading end 164 of the tow hook body 144 in the rearward vehicle longitudinal direction, as described in more detail herein. Although the front fasteners 220 are depicted herein as being separate components from the tow hook body 144, it should be appreciated that the front fasteners 220 may be integrally formed as a one-piece monolithic structure with the tow hook body 144 to removably couple the tow hook body 144 to the support bracket 146 without any additional components.

Referring still to FIGS. 3 and 4, the disengagement bracket 148 includes a vertical portion 222 and a horizontal portion 224 extending from the vertical portion 222. The vertical portion 222 has a lower end 226 from which the horizontal portion 224 extends and an opposite upper end 228 through which an aperture 230 is formed. The horizontal portion 224 has an upper surface 232, a lower surface 234 opposite the upper surface 232, and a front end 236 opposite the vertical portion 222. In embodiments, a rear fastener hole 238 is formed in the horizontal portion 224 and extends through the upper surface 232 and the lower surface 234 thereof proximate the front end 236. The rear fastener hole 238 is coaxial with the rear open-ended hole 206 formed in the tow hook body 144.

In embodiments, as best shown in FIG. 3, the lower surface 234 of the horizontal portion 224 of the disengagement bracket 148 includes a tapered front edge 240. The tapered front edge 240 corresponds to the end 205 of the upper surface 204 of the third horizontal portion 182 which is also tapered. Referring still to FIG. 3, the disengagement bracket 148 also includes a rib 242 extending from the lower surface 234 of the horizontal portion 224 proximate the vertical portion 222 in a direction opposite the upper surface 232 of the horizontal portion 224. The rib 242 is positioned between a pair of side walls of the disengagement bracket 148. The rib 242 extends downwardly beyond distal ends of the pair of side walls. The rib 242 is rounded to gradually direct deflection of the tow hook body 144 in a downward vehicle vertical direction as the rib 242 contacts the third horizontal portion 182 of the tow hook body 144, as discussed in more detail herein.

Referring again to FIGS. 4 and 6A, in embodiments, the disengagement bracket 148 further includes a stopper 244 extending from the front end 236 of the horizontal portion 224. The stopper 244 may be substantially C-shaped such that the stopper 244 extends from the front end 236 of the horizontal portion 224 in a direction opposite the vertical portion 222, bends downwardly, and returns to extend in a direction back toward the vertical portion 222 at the lower surface 234 of the horizontal portion 224. In other embodiments, the stopper 244 may be formed as a protrusion extending from the front end 236 of the horizontal portion 224 and in a direction opposite the upper surface 232 of the horizontal portion 224. As described in more detail herein, the stopper 244 assists in retaining the tow hook body 144 with the disengagement bracket 148 and inhibit movement of the tow hook body 144 in the forward vehicle longitudinal direction relative to the disengagement bracket 148.

Figure 6A:
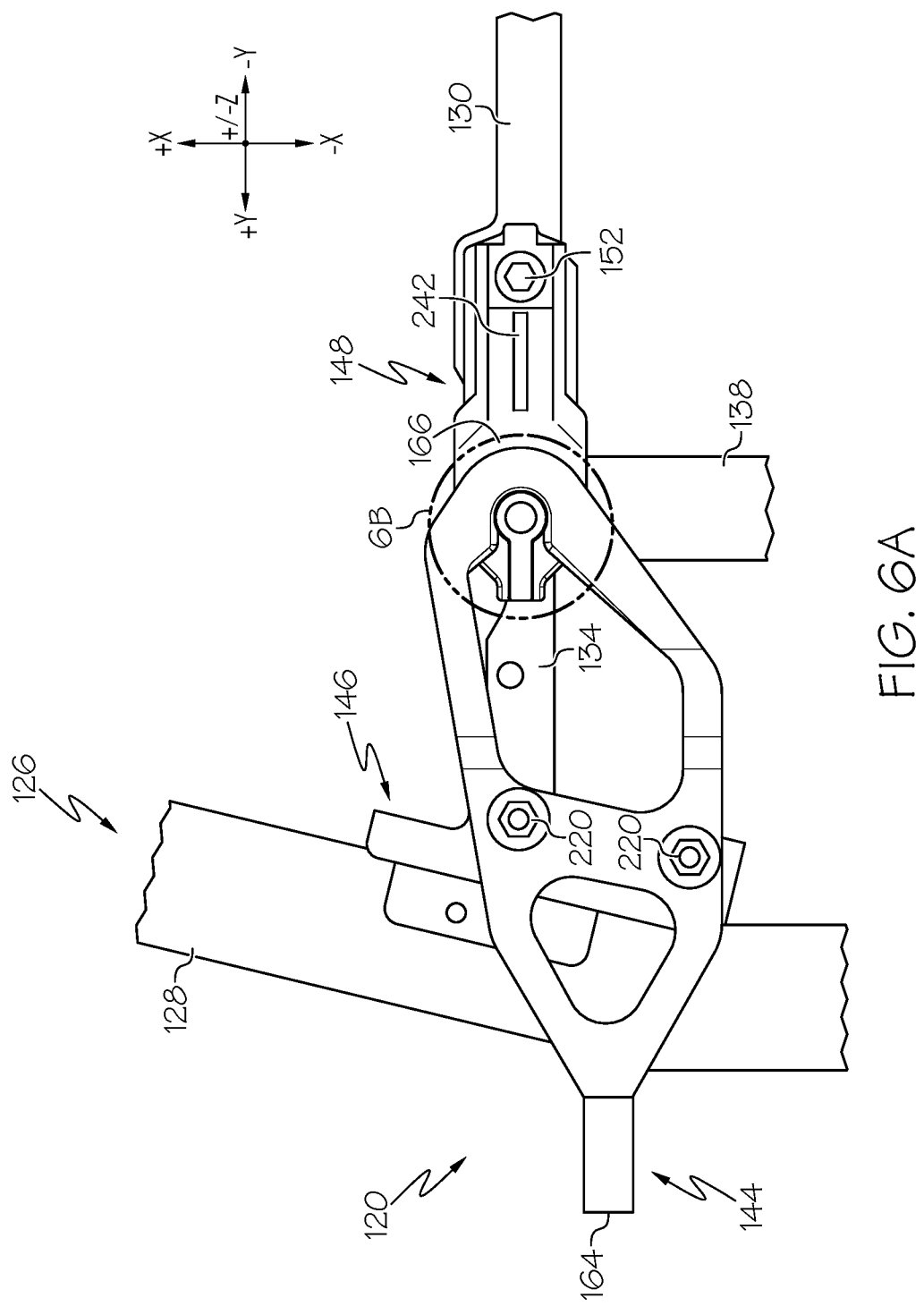
FIG. 6A schematically depicts a bottom view of the tow hook assembly mounted to the vehicle frame, according to one or more embodiments shown and described herein.

Referring now to FIG. 6A, a partial bottom view of the tow hook assembly 120 is illustrated with the rear fastener 154 and the rear washer 246 hidden from view. An extension portion 245 extends from the stopper 244 in a rearward vehicle longitudinal direction toward the rear end of the tow hook body 144. An insert portion 247 is formed at an end of the extension portion 245 opposite the stopper 244. As shown, the insert portion 247 is received within the rear open-ended hole 206 formed in the tow hook body 144 to removably engage the disengagement bracket 148 with the tow hook body 144. A width W1 of the open end 209 of the rear open-ended hole 206 is less than an outer diameter D1 of the insert portion 247. It should be appreciated that the smaller the width W1 of the open end 209 is relative to the outer diameter D1 of the insert portion 247, the greater the amount of force is required to disengage the tow hook body 144 from the disengagement bracket 148, as described herein. The rear fastener hole 238 extends through the insert portion 247 such that the rear fastener 154 may extend through the insert portion 247. Although reference may be made herein to the rear fastener 154 itself disengaging from the rear open-ended hole 206 formed in the tow hook body 144, it should be appreciated that, in embodiments, the tow hook body 144 may be removably engaged with the disengagement bracket 148 by the insert portion 247 alone without requiring the rear fastener 154.

Figure 6B:
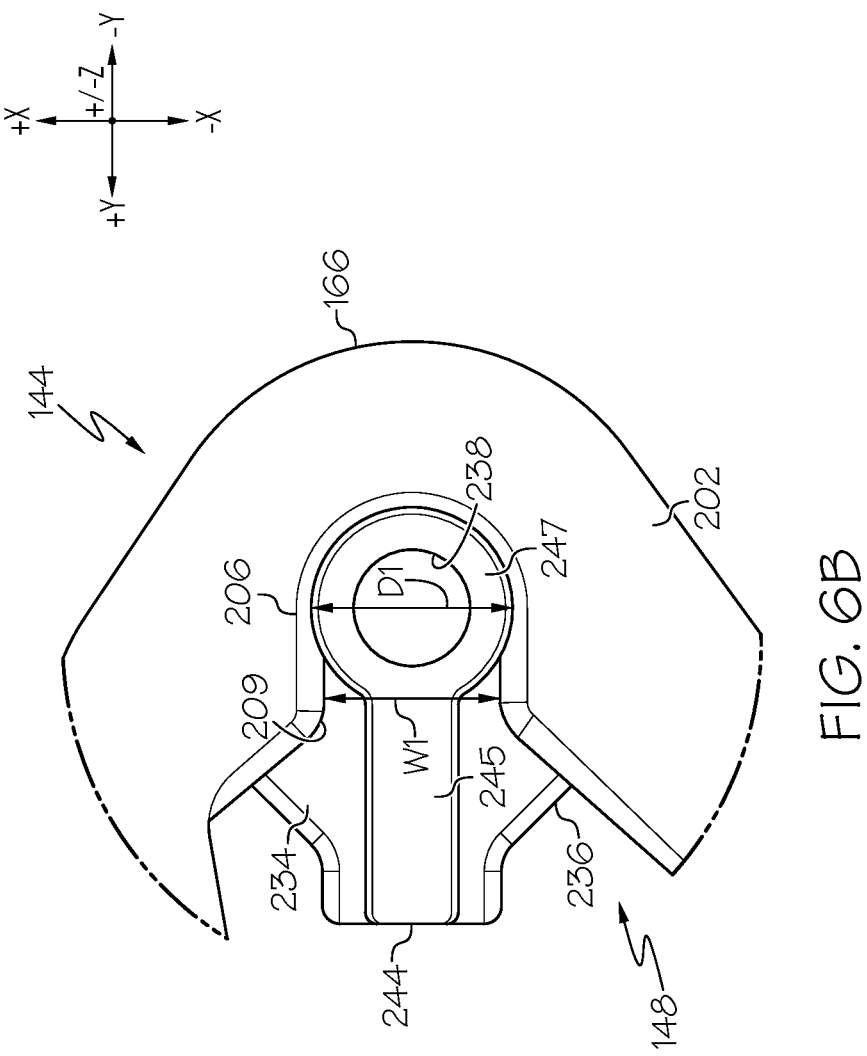
FIG. 6B schematically depicts an enlarged partial bottom view of the tow hook assembly taken from circle 6B of FIG. 6A with a rear fastener and a rear washer hidden from view, according to one or more embodiments shown and described herein.

As shown in FIG. 4, the rear fastener 154 extends through the rear open-ended hole 206 formed in the tow hook body 144 and the rear fastener hole 238 formed in the disengagement bracket 148. In embodiments, a rear washer 246 is provided on the rear fastener 154 on a side of the tow hook body 144 opposite the disengagement bracket 148. As described herein, the rear fastener 154, either directly or by extension through the insert portion 247, disengages from the rear open-ended hole 206 formed in the tow hook body 144 upon a force exceeding a predetermined threshold being applied against the leading end 164 of the tow hook body 144 in the rearward vehicle longitudinal direction. Although the rear fastener 154 is depicted herein as being a separate component from the disengagement bracket 148, it should be appreciated that the rear fastener 154 may be integrally formed as a one-piece monolithic structure with the disengagement bracket 148 to removably couple the disengagement bracket 148 to the tow hook body 144 without any additional component. As such, in embodiments, the rear fastener 154 may be integrally formed as a one-piece monolithic structure with the insert portion 247 (FIG. 6B) as well. The rear washer 246 inhibits vertical separation of the tow hook body from the disengagement bracket 148 prior to the rear fastener 154 disengaging from the rear open-ended hole 206. Additionally, the rear washer 246 allows the tow hook body 144 to slide against the rear washer 246 during disengagement of the rear fastener 154, and in embodiments, the insert portion 247 (FIG. 6B), from the rear open-ended hole 206.

Figure 5:
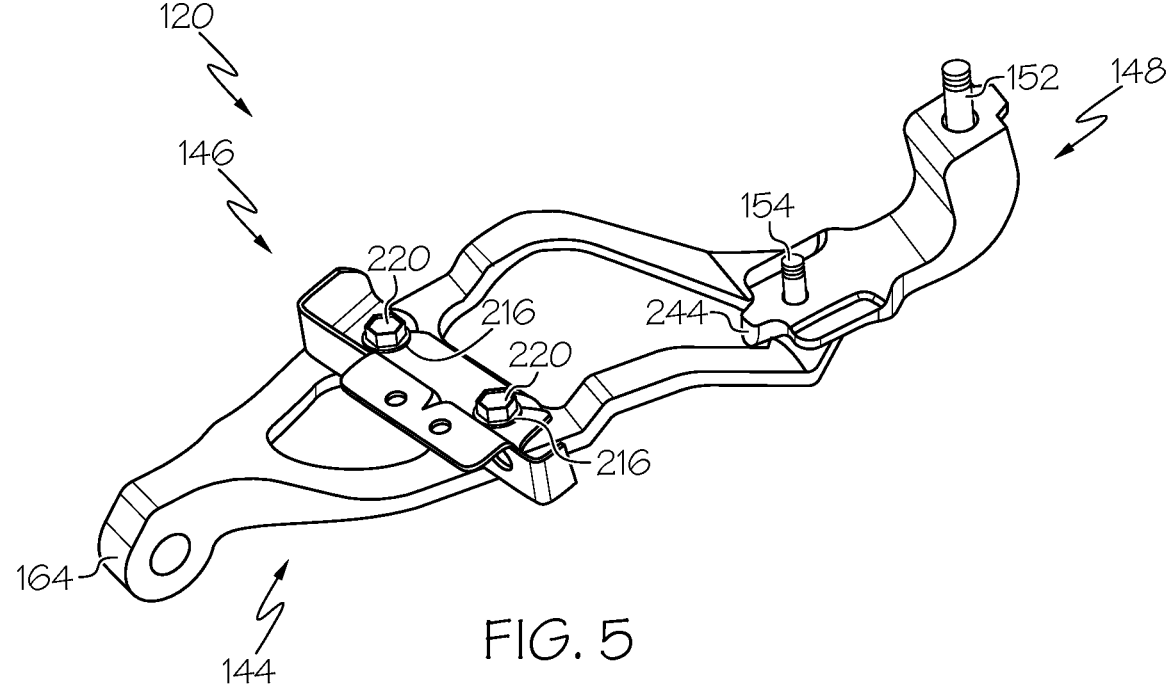
FIG. 5 schematically depicts an assembled perspective view of the tow hook assembly, according to one or more embodiments shown and described herein.

Referring now to FIG. 5, the tow hook assembly 120 is shown in an assembled state and shown mounted to the front bumper beam 128, the crossmember 138, and the first side rail 130 in FIG. 6A. Specifically, the support bracket 146 is mounted to the tow hook body 144 with the front fasteners 220 extending through the front open-ended holes 216 formed in the support bracket 146 and the front fastener holes 192 formed in the tow hook body 144. Additionally, the rear fastener 154 is shown extending through the rear fastener hole 238 formed in the disengagement bracket 148 and extending through the rear open-ended hole 206 formed in the tow hook body 144. As described herein, the leading end 164 of the tow hook body 144 extends further forward of the front bumper beam 128 in the vehicle longitudinal direction such that the leading end 164 of the tow hook body 144 comes into contact with a barrier, such as an obstacle, prior to the barrier coming into contact with any other part of the vehicle 100.

Figure 7:
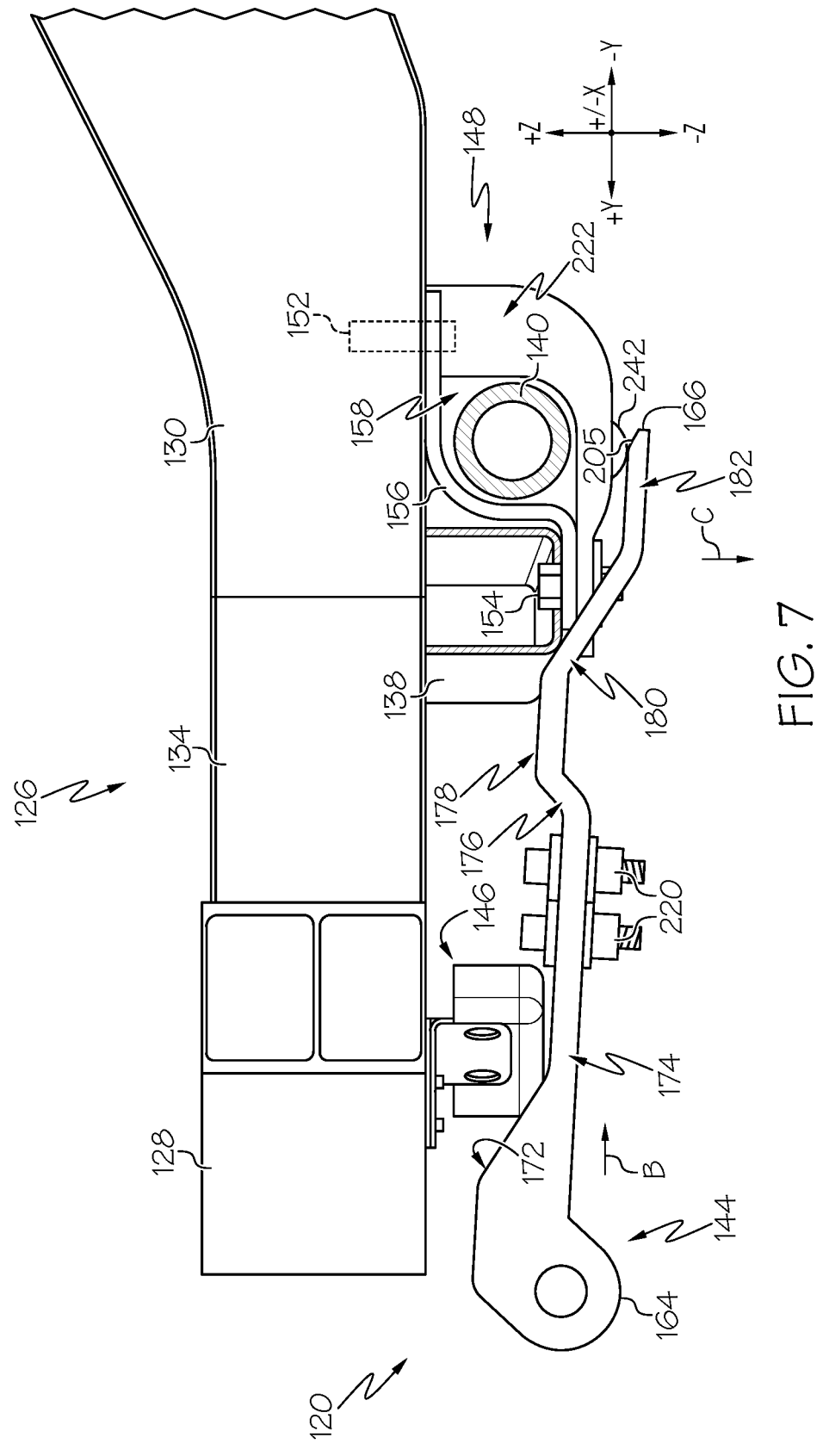
FIG. 7 schematically depicts a side view of the tow hook assembly mounted to the vehicle frame in an intermediate state at a first time during a front end collision, according to one or more embodiments shown and described herein.
Figure 8:
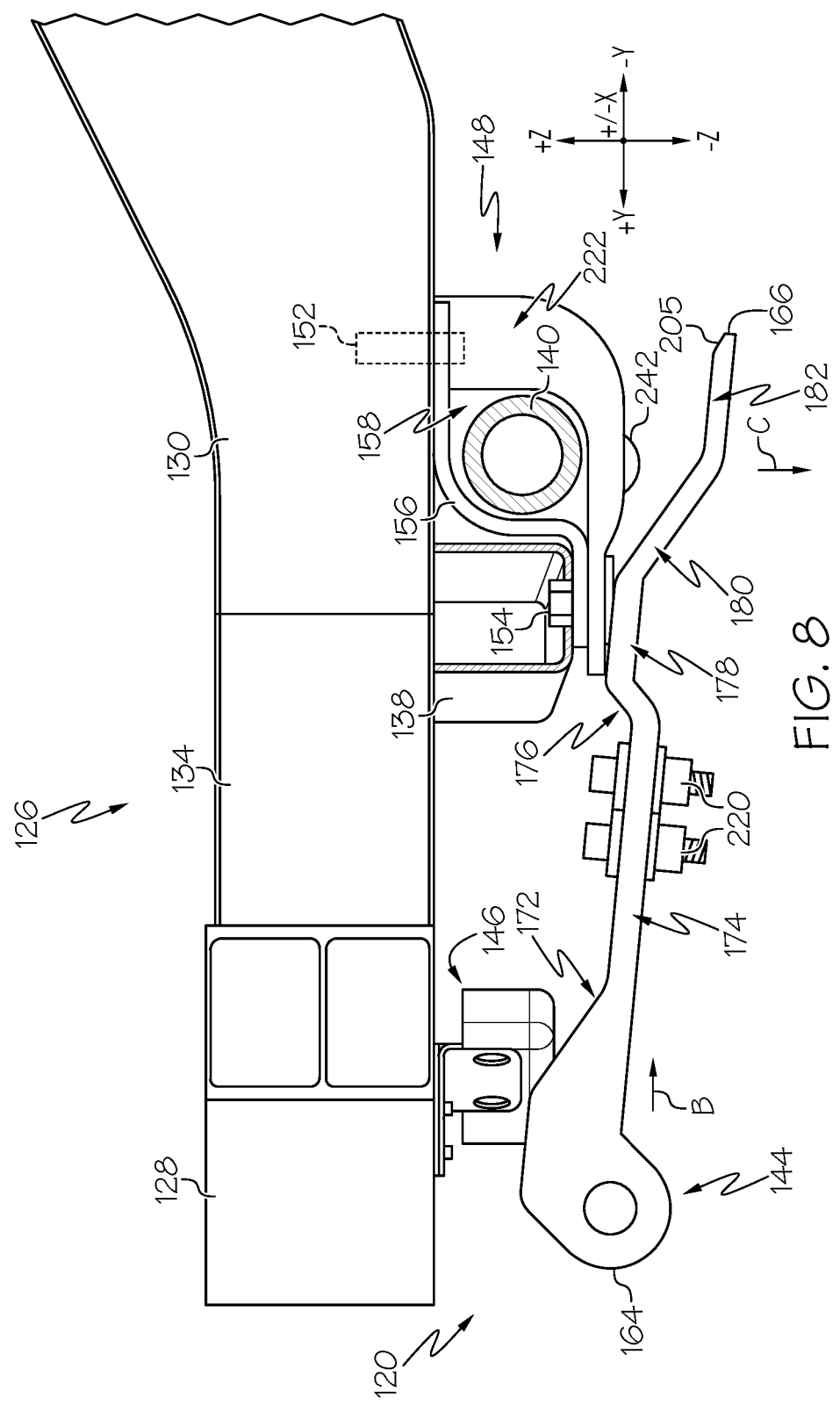
FIG. 8 schematically depicts a side view of the tow hook assembly mounted to the vehicle frame in a disengaged state at a second time during the front end collision, according to one or more embodiments shown and described herein.

Referring now to FIGS. 3, 7 and 8, operation of the tow hook assembly 120 during a front end collision is depicted and, specifically, movement of the tow hook body 144 relative to the support bracket 146 and the disengagement bracket 148 fixed to the vehicle frame 126. Initially, referring to FIG. 3, the tow hook assembly 120 is shown in the assembled state in which the leading end 164 of the tow hook body 144 has not yet made contact with a barrier. As such, the tow hook body 144 is removably attached to the support bracket 146 via the front fasteners 220 extending through the first horizontal portion 174 of the tow hook body 144 and the front open-ended holes 216 formed in the support bracket 146. Additionally, the tow hook body 144 is removably attached to the disengagement bracket 148 via the insert portion 247 (FIG. 6B) or the rear fastener 154 itself received within the rear open-ended hole 206 formed in the third horizontal portion 182 of the tow hook body 144. As shown in FIG. 3, in the assembled state, the end 205 of the third horizontal portion 182 having a taper mates with the tapered front edge 240 of the horizontal portion 224 of the disengagement bracket 148. Additionally, the front end 236 of the horizontal portion 224 of the disengagement bracket 148 abuts against the rear angled portion 180 of the tow hook body 144. Accordingly, movement of the tow hook body 144 in the rearward vehicle longitudinal direction will immediately result in movement of the tow hook body 144 in the downward vehicle vertical direction, as described in more detail herein.

Referring now to FIG. 7, the tow hook assembly 120 is illustrated in an intermediate state at a first time during a front end collision. Upon a force exceeding a predetermined threshold being applied rearwardly against the leading end 164 of the tow hook body 144, the tow hook body 144 is pushed in the rearward vehicle longitudinal direction relative to the support bracket 146 and the disengagement bracket 148, as shown by arrow B, such that the front fastener 220 begins to disengage the front open-ended hole 216 formed in the support bracket 146 and the insert portion 247 (FIG. 6B) or the rear fastener 154 itself begins to disengage the rear open-ended hole 206 formed in the tow hook body 144. In embodiments, the predetermined threshold is equal to or greater than 5 kN and less than or equal to 20 kN. In embodiments, the predetermined threshold is equal to or greater than 10 kN and less than or equal to 15 kN.

Referring still to FIG. 7, as the tow hook body 144 is moved in the rearward vehicle longitudinal direction, the rear end 166 of the tow hook body 144 is moved in the downward vehicle vertical direction, as shown by arrow C, to further facilitate disengagement of the tow hook body 144 with the support bracket 146 and the disengagement bracket 148. More specifically, as shown in FIG. 7, the side wall 210 of the support bracket 146 comes into contact with the front angled portion 172 of the tow hook body 144, the front end 236 of the disengagement bracket 148 rides upward along the rear angled portion 180, and the rear end 166 of the tow hook body 144 rides downward along the rib 242 of the disengagement bracket 148. Accordingly, the tow hook body 144 begins to tilt such that the rear end 166 of the tow hook body 144 is pushed downward in the vehicle vertical direction relative to the leading end 164 of the tow hook body 144.

Referring now to FIG. 8, the tow hook assembly 120 is illustrated in a disengaged state at a second time during the front end collision. Accordingly, continued force applied against the leading end 164 of the tow hook body 144 continues to push the tow hook body 144 in the rearward vehicle longitudinal direction, as shown by arrow B. During this movement, the side wall 210 of the support bracket 146 continues to ride upward along the front angled portion 172 of the tow hook body 144 such that the front fasteners 220 disengage from the front open-ended holes 216 formed in the support bracket 146. Additionally, the front end 236 of the disengagement bracket 148 continues to ride upward along the rear angled portion 180 of the tow hook body 144 and onto the second horizontal portion 178 of the tow hook body 144 such that the insert portion 247 (FIG. 6B) or the rear fastener 154 itself disengages from the rear open-ended hole 206 formed in the tow hook body 144. Accordingly, as the tow hook assembly 120 moves from the intermediate state illustrated in FIG. 7 to the disengaged state illustrated in FIG. 8, the rear end 166 of the tow hook body 144 continues to be pushed downward in the vehicle vertical direction, as shown by arrow C, relative to the leading end 164 of the tow hook body 144 until the tow hook body 144 is entirely separated from the support bracket 146 and the disengagement bracket 148.

From the above, it is to be appreciated that defined herein is a tow hook assembly for a vehicle including a tow hook body that detaches from a support bracket and a disengagement bracket as force is applied to a leading end of the tow hook body during a front end collision. The tow hook body has at least one of a front angled portion and a rear angled portion that contact the support bracket or the disengagement bracket, respectively, to facilitate downward deflection of the tow hook body at a rear end thereof as the tow hook body moves rearward during the front end collision relative to the support bracket and the disengagement bracket. Accordingly, the tow hook body is moved out of the way of impact to reduce the degree of damage to the barrier or obstacle being impacted by the leading end of the tow hook body during the front end collision.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A tow hook assembly comprising:
a tow hook body including a leading end, an opposite rear end, and an angled portion sloping downwardly in a direction opposite the leading end, a rear open-ended hole formed in the rear end;

12 a support bracket, a front open-ended hole formed in the support bracket;
a disengagement bracket;
a front fastener extending through the front open-ended hole formed in the support bracket to removably couple the tow hook body to the support bracket; and
an engagement member extending through the rear open-ended hole formed in the tow hook body to removably couple the disengagement bracket to the tow hook body,
wherein upon a force exceeding a predetermined threshold being applied against the leading end of the tow hook body, the front fastener disengages the front open-ended hole formed in the support bracket and the engagement member disengages the rear open-ended hole formed in the tow hook body,
wherein the disengagement bracket includes a rib extending from a bottom surface of the disengagement bracket, the rib directing the rear end of the tow hook body in a downward vehicle vertical direction upon movement of the tow hook body in a rearward vehicle longitudinal direction and contacting the rib.

2. The tow hook assembly of claim 1, wherein a front fastener hole is formed in the tow hook body coaxial with the front open-ended hole formed in the support bracket, the front fastener extending through the front fastener hole and the front open-ended hole.

3. The tow hook assembly of claim 1, wherein a rear fastener hole is formed in the disengagement bracket coaxial with the rear open-ended hole formed in the tow hook body, the engagement member includes a rear fastener extending through the rear fastener hole and the rear open-ended hole.

4. The tow hook assembly of claim 1, wherein the angled portion is a front angled portion formed in the tow hook body at a side of the support bracket opposite the disengagement bracket.

5. The tow hook assembly of claim 1, wherein the angled portion is a rear angled portion formed in the tow hook body between the support bracket and the disengagement bracket.

6. The tow hook assembly of claim 1, wherein the angled portion is a front angled portion formed in the tow hook body at a side of the support bracket opposite the disengagement bracket, and the tow hook body further comprises a rear angled portion formed in the tow hook body between the support bracket and the disengagement bracket.

7. The tow hook assembly of claim 1, wherein the rear open-ended hole formed in the tow hook body has an open end facing the leading end of the tow hook body.

8. The tow hook assembly of claim 1, wherein the support bracket includes a bottom wall and a side wall extending upwardly from the bottom wall, the front open-ended hole formed in the bottom wall of the support bracket and having an open end facing opposite the side wall of the support bracket.

9. A tow hook assembly comprising:
a tow hook body including a front fastener, a rear open-ended hole formed proximate an opposite rear end of the tow hook body, a front angled portion formed between the front fastener and a leading end of the tow hook body, and a rear angled portion formed between the front fastener and the rear open-ended hole, the front angled portion slopes downwardly in a direction opposite the leading end, and the rear angled portion slopes downwardly in a direction opposite the leading end;

a support bracket having a front open-ended hole for removably receiving the front fastener of the tow hook body; and a disengagement bracket having an engagement member removably received within the rear open-ended hole formed in the tow hook body.

10. The tow hook assembly of claim 9, wherein upon a force exceeding a predetermined threshold being applied against the leading end of the tow hook body, the front fastener disengages the front open-ended hole formed in the support bracket and the engagement member disengages the rear open-ended hole formed in the tow hook body.

11. The tow hook assembly of claim 10, wherein a front fastener hole is formed in the tow hook body coaxial with the front open-ended hole formed in the support bracket, the front fastener extending through the front fastener hole and the front open-ended hole.

12. The tow hook assembly of claim 10, wherein a rear fastener hole is formed in the disengagement bracket coaxial with the rear open-ended hole formed in the tow hook body, and wherein the engagement member includes a rear fastener extending through the rear fastener hole and the rear open-ended hole.

13. The tow hook assembly of claim 10, wherein the rear open-ended hole formed in the tow hook body has an open end facing the leading end of the tow hook body.

14. The tow hook assembly of claim 10, wherein the support bracket includes a bottom wall and a side wall extending upwardly from the bottom wall, the front open-ended hole formed in the bottom wall of the support bracket and having an open end facing opposite the side wall of the support bracket.

15. A vehicle comprising:

a vehicle frame including:

a front bumper beam;

a stabilizer bar;

a first side rail extending from the front bumper beam; and a crossmember extending in a vehicle lateral direction between the front bumper beam rearward of the front bumper beam; and a first tow hook assembly including:

a tow hook body including a leading end, an opposite rear end, and an angled portion sloping downwardly in a direction opposite the leading end, a rear open-ended hole formed in the rear end;

a stabilizer bar shield extending between the disengagement bracket and the crossmember, the stabilizer bar shield cooperating with the disengagement bracket to define a cavity, wherein the stabilizer bar extends through the cavity;

a support bracket mounted to the front bumper beam, a front open-ended hole formed in the support bracket, the tow hook body removably coupled to the support bracket at the front open-ended hole; and a disengagement bracket mounted to the first side rail, the tow hook body removably coupled to the disengagement bracket at the rear open-ended hole.

16. The vehicle of claim 15, further comprising:

a second side rail extending from the front bumper beam, the crossmember extending between the first side rail and the second side rail; and a second tow hook assembly, the first tow hook assembly mounted to a first end of the crossmember and the second tow hook assembly mounted to a second end of the crossmember opposite the first end.

17. The vehicle of claim 15, wherein the leading end of the tow hook body extends further forward than the front bumper beam, and wherein upon a force exceeding a predetermined threshold being applied against the leading end of the tow hook body, the front fastener disengages the front open-ended hole formed in the support bracket and the engagement member disengages the rear open-ended hole formed in the tow hook body.

* * * * *